UNITED STATES PATENT OFFICE.

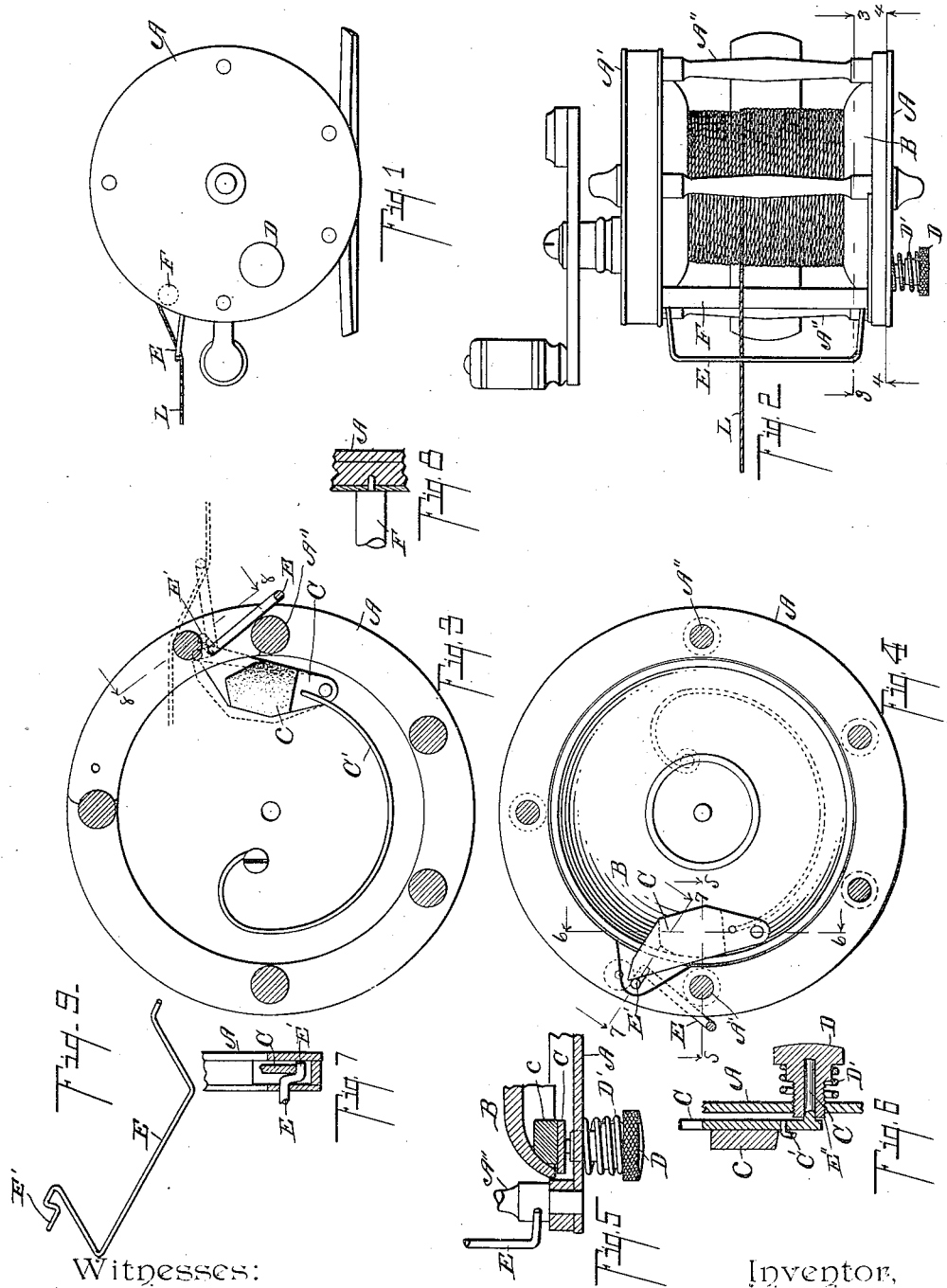

HENRY BAUMGARTEL, OF STURGIS, MICHIGAN, ASSIGNOR OF ONE-HALF TO JAY G. WAIT, OF STURGIS, MICHIGAN.

FISH-LINE REEL.

No. 843,514.   Specification of Letters Patent.   Patented Feb. 5, 1907.

Application filed April 9, 1906. Serial No. 310,768.

*To all whom it may concern:*

Be it known that I, HENRY BAUMGARTEL, a citizen of the United States, residing at Sturgis, in the county of St. Joseph and State of Michigan, have invented certain new and useful Improvements in Fish-Line Reels, of which the following is a specification.

This invention relates to improvements in fish-line reels.

The objects of this invention are, first, to provide in a fish-line reel a brake device adapted to automatically act upon the spool when the line is free from tension; second, to provide an improved fish-line reel in which the liability of back winding or backlashing of the line is reduced to a minimum; third, to provide an improved fish-line reel embodying the above advantages which is very simple and economical in structure.

Further objects and objects relating to structural details will definitely appear from the detailed description to follow.

I accomplish the objects of my invention by the devices and means described in the following specification.

The invention is clearly defined, and pointed out in the claims.

A structure embodying the features of my invention is clearly illustrated in the accompanying drawings, forming a part of this specification, in which—

Figure 1 is an end elevation of my improved fish-line reel looking from the right of Fig. 2. Fig. 2 is a plan of my improved fish-line reel. Fig. 3 is an enlarged transverse section taken on a line corresponding to line 3 3 of Fig. 2, showing structural details. Fig. 4 is an enlarged transverse section taken on a line corresponding to line 4 4 of Fig. 2. Fig. 5 is a detail section taken on line 5 5 of Fig. 4. Fig. 6 is a detail section on line 6 6 of Fig. 4. Fig. 7 is a detail section on line 7 7 of Fig. 4. Fig. 8 is a detail section on line 8 8 of Fig. 3. Fig. 9 is a perspective view of the brake-lever E.

In the drawings the sectional views are taken looking in the direction of the little arrows at the ends of the section-lines, and similar letters of reference refer to similar parts throughout the several views.

Referring to the drawings, the heads A A' of the reel are connected by suitable pillars A''. The spool B is mounted on a suitable shaft in the usual or any desired manner. I arrange within the head A a brake C, having a friction-shoe c thereon, adapted to engage the spool B. The brake C is provided with a pivot c', which is mounted on the screw D. The screw D is threaded through the cap-plate of the head A, so that by adjusting the screw the brake C is adjusted to and from the spool-head. A coiled spring D' is arranged upon the screw D for applying tension thereto, so that it is held in its adjusted position.

The brake C is held normally in its engaging position by the spring C', one end of which is connected thereto and the other to the head A, as clearly appears in Fig. 3. The brake is thrown out of its engaging position by the lever E. The lever E is preferably bail-like in shape and is pivoted on the heads A A', extending across the front of the reel, as clearly appears from the drawing. One arm of the lever E is provided with a crank-like arm E', arranged to engage the brake C. The tension of the spring C' on the brake holds the lever E normally in the position shown in the drawing in full lines. When the lever E is raised, as indicated by dotted lines in Fig. 3, the brake is thrown out of its engaging position, thereby freeing the spool.

The lever E is operated by the fishing-line, as L, which is arranged under the same. (See Figs. 1, 2, and 3.) When the line is taut or there is tension thereon, the lever E is lifted upwardly, thereby releasing the brake. As soon as the line slackens or the tension is removed therefrom the spring C' throws the brake into its engaging position and also returns the lever E to its normal position. The roller F, over which the line is passed from the spool, is arranged above the lever E. This roller guides the line to the lever E, so that it is immaterial what quantity of line may be on the spool—that is, whether it is full or only partially full the line is delivered uniformly. This roller also prevents the vibration of the line in delivery and the consequent vibration of the lever E.

By arranging the parts as I have illustrated and described I provide a reel in which back winding or backlashing is effectively prevented. No care or skill is required of the operator to prevent back winding or backlashing, as is required in reels of common construction. So long as there is tension upon the line, as is occasioned when the spool is delivering the line at the proper speed, the brake device is held out of engagement. As soon, however, as the spool delivers to the main line faster than is required the slack of the tension of the line allows the brake to act, checking the spool until the line is again under tension and the spool released.

In practice with reels of the common construction it is necessary to thumb the spool in order to prevent its overrunning and to stop the same when the bait drops. Otherwise overrunning and consequent back winding are almost certain to occur. In my improved reel this objectionable feature is overcome, so that, as before stated, a novice or unskilled person can manipulate the device effectively.

By the means provided for adjusting the brakes accurate fitting of the parts in manufacturing is not required, as they may be adjusted by these means. By these adjusting means the brakes can be nicely regulated to secure the desired friction and also to compensate for the wear of the parts.

It is evident from the foregoing description and drawings that my improvements are simple and economical in structure and that they may, if desired, be readily applied to the reels in common use.

I have illustrated and described my improved fish-line reel in detail in the form preferred by me on account of its simplicity and economy of construction. I am, however, aware that it is capable of considerable variation in structural details without departing from my invention.

Having thus described my invention, what I claim as new, and desire to secure by Letters Patent, is—

1. In a fish-line reel, the combination with the reel-frame, of a spool; a pivoted brake; an adjustable screw on which said brake is mounted; a spring arranged to hold said brake normally in its engaging position; a bail-like brake-lever journaled in said frame, arranged across the front thereof, adapted to be actuated by the fish-line; a crank-like arm on said brake-lever arranged to engage said brake; and a line-guide roller by which the line is delivered to said brake-lever arranged across the reel-frame above said brake-lever, for the purpose specified.

2. In a fish-line reel, the combination with the reel-frame, of a spool; a pivoted brake; means for adjusting said brake; a spring arranged to hold said brake normally in its engaging position; a bail-like brake-lever journaled in said frame, arranged across the front thereof, adapted to be actuated by the fish-line; a crank-like arm on said brake-lever arranged to engage said brake; and a line-guide roller by which the line is delivered to said brake-lever arranged across the reel-frame above said brake-lever, for the purpose specified.

3. In a fish-line reel, the combination with the reel-frame, of a spool; a pivoted brake; a spring arranged to hold said brake normally in its engaging position; a bail-like brake-lever journaled in said frame, arranged across the front thereof, adapted to be actuated by the fish-line; a crank-like arm on said brake-lever arranged to engage said brake; and a line-guide roller by which the line is delivered to said brake-lever arranged across the reel-frame above said brake-lever, for the purpose specified.

4. In a fish-line reel, the combination with the reel-frame, of a spool; a pivoted brake; an adjustable screw on which said brake is mounted; a spring arranged to hold said brake normally in its engaging position; a bail-like brake-lever journaled in said frame, arranged across the front thereof, adapted to be actuated by the fish-line; and a crank-like arm on said brake-lever arranged to engage said brake, for the purpose specified.

5. In a fish-line reel, the combination with the reel-frame, of a spool; a pivoted brake; means for adjusting said brake; a spring arranged to hold said brake normally in its engaging position; a bail-like brake-lever journaled in said frame, arranged across the front thereof, adapted to be actuated by the fish-line; and a crank-like arm on said brake-lever arranged to engage said brake, for the purpose specified.

6. In a fish-line reel, the combination with the reel-frame, of a spool; a pivoted brake; an adjustable screw on which said brake is mounted; a spring arranged to hold said brake normally in its engaging position; a bail-like brake-lever journaled in said frame, arranged across the front thereof, adapted to be actuated by the fish-line; and a line-guide roller by which the line is delivered to said brake-lever arranged across the reel-frame above said brake-lever, for the purpose specified.

7. In a fish-line reel, the combination with the reel-frame, of a spool; a pivoted brake; means for adjusting said brake; a spring arranged to hold said brake normally in its engaging position; a bail-like brake-lever journaled in said frame, arranged across the front thereof, adapted to be actuated by fish-line; and a line-guide roller arranged across the reel-frame above said brake-lever, for the purpose specified.

8. In a fish-line reel, the combination with the reel-frame, of a spool; a pivoted brake; a screw on which said brake is mounted; a spring arranged to hold said brake normally in its engaging position; and a bail-like brake-lever journaled in said frame, arranged across the front thereof, adapted to be actuated by the fish-line, for the purpose specified.

9. In a fish-line reel, the combination with the reel-frame, of a spool; a pivoted brake; means for adjusting said brake; a spring arranged to hold said brake normally in its engaging position; and a bail-like brake-lever journaled in said frame, arranged across the front thereof, adapted to be actuated by the fish-line, for the purpose specified.

10. In a fish-line reel, the combination of a spool; a brake arranged to normally act on said spool; means for adjusting said brake; a fish-line; a brake-lever adapted to be actuated by the fish-line when the same is under tension; and a roller from which the fish-line is delivered to said brake-lever, for the purpose specified.

11. In a fish-line reel, the combination of a spool; a brake arranged to normally act on said spool; a fish-line; a friction-lever adapted to be actuated by the fish-line when the same is under tension; and an adjustable support for said brake whereby it may be adjusted to bring it into proper relation to said spool to compensate for wear and the like, as specified.

12. In a fish-line reel, the combination with a reel, of a spool having a concaved flange; a brake arranged to move in a plane substantially at right angles to the axis of said spool whereby it engages said concaved flange of said spool when moved outwardly; and means for adjusting said brake, for the purpose specified.

In witness whereof I have hereunto set my hand and seal in the presence of two witnesses.

HENRY BAUMGARTEL. [L. S.]

Witnesses:
LULU G. GREENFIELD,
OTIS A. EARL.